United States Patent [19]

Frenkel

[11] Patent Number: 5,351,147
[45] Date of Patent: Sep. 27, 1994

[54] PULSE FREQUENCY DIVISION MULTIPLEXING

[75] Inventor: Anatoly Frenkel, Somerville, N.J.

[73] Assignee: Bell Communications Research, Inc., Livingston, N.J.

[21] Appl. No.: 966,784

[22] Filed: Oct. 27, 1992

[51] Int. Cl.$^5$ .............................................. H04J 14/02
[52] U.S. Cl. .................................. 359/124; 359/123; 359/140
[58] Field of Search ............... 359/124, 127, 128, 133, 359/191, 192, 123, 140

[56] References Cited

U.S. PATENT DOCUMENTS

| | | | |
|---|---|---|---|
| 4,677,618 | 6/1987 | Haas | 359/124 |
| 4,890,893 | 1/1990 | Smoot | 359/124 |
| 4,956,834 | 9/1990 | Coleman | 359/140 |
| 4,959,826 | 9/1990 | Smith | 359/191 |

FOREIGN PATENT DOCUMENTS

| | | | |
|---|---|---|---|
| 0532021 | 3/1993 | European Pat. Off. | 359/124 |
| 0043231 | 2/1987 | Japan | 359/124 |
| 0282931 | 11/1989 | Japan | 359/124 |
| 0155330 | 6/1990 | Japan | 359/124 |

OTHER PUBLICATIONS

"All-Optical Devices Using Nonlinear Fiber Couplers", D. Rowland, J. Of Lightwave Tech., vol. 9, Sep. 1991, pp. 1074–1082.

"Computer Simulations of Fully Cascadable All-Optical Logic Using Nonlinear Semiconductor Etalons", Richardson et al., J. Of Quantum Electronics, vol. 27, Mar. 1991, pp. 804–808.

"Parallel Operation of a 32 × 16 Symmetric Self-Electrooptic Effect Device Array", McCormick et al., Photonic Tech. Letters, vol. 3, Mar. 1991, pp. 232–234.

"Diode Laser Based Optical Logical Devices", Dagenais et al., Critical Rev. of Opt. Sci. & Tech., Athale, Ed., vol. CR35, 1990, pp. 126–154.

Primary Examiner—Leslie Pascal
Attorney, Agent, or Firm—Leonard Charles Suchyta; Lionel N. White

[57] ABSTRACT

Data transmissions from each of a multiplicity of users in a fiber-optic communications network employ pulse stream frequencies which uniquely differ by a given period offset, $\Delta t$, and are thus characteristic of each particular user. Such pulse streams 11, 12, etc. are multiplexed for transmission through the network, yet may be individually extracted at the facilities of a receiving user by means of a selector 26 comprising one or more non-linear optical logic devices 35, such as bistable semiconductor laser amplifiers or self-electrooptic effect devices, which are associated with optical delay means 34 having period offset characteristics peculiar to that of a specific transmitting user.

10 Claims, 4 Drawing Sheets

PULSE FREQUENCY DIVISION MULTIPLEXING

BACKGROUND OF THE INVENTION

This invention relates to means for increasing the transmission capacity of communications systems, particularly multiple user optical fiber systems, which entails pulse frequency division multiplexing. By utilizing the pulse modulation, i.e., the pulse repetition rate, of transmitting light sources to identify the individual signals of myriad simultaneous users, the effective throughput of local communications systems may be increased to hundreds of gigabits per second (Gb/s).

Single-mode optical fibers widely used in telecommunication networks have extensive bandwidths ranging into hundreds of GHz-km. Despite this potential, the highest optical fiber transmission bit rates presently utilized are limited by current optoelectronic conversion technology to a range of only several Gb/s. In order to achieve maximum data capacity, or throughput, in these networks, the most practical expedient is some system of multiplexing the individual transmissions of multiple customers or users of the networks.

A number of such multiplexing systems have been implemented, notable among which is high density wavelength division multiplexing (WDM) incorporating tunable wavelength selection to distinguish individual customer signals. Although offering some promise, this approach, as well as coherent communications techniques using local optical oscillation, have exhibited significant practical and economical difficulties. Likewise, code division multiple access (CDMA) and its variants using spread-spectrum communications have attracted some attention, but in addition to being relatively slow, suffer from dispersion and other non-linear effects in optical fibers which in turn rely upon dispersion compensation techniques not yet readily available.

The pulse frequency division multiplexing (PFDM) system of the present invention, on the other hand, provides numerous advantages over those earlier proposed techniques. Pulse frequency, for example, is more simply controllable electrically than optical frequency of semiconductor laser signal sources. Further, PFDM is asynchronous in implementation and thus provides a distinct advantage over time division multiplexing systems. The invention additionally incorporates a system of low power, high speed optical gate elements by which individually identified user signal throughput may be maintained at multi-Gb/s rates within readily controllable bit-error ratios (BER).

SUMMARY OF THE INVENTION

The present PFDM system is particularly adapted for use in local telecommunication networks, e.g., LAN arrangements, where users or customers may be assigned specific individual pulse rate transmission frequencies. The maintenance of such assigned frequencies throughout the network may readily be achieved by means of a reference signal, either that of one of the system users or a master signal, which is transmitted to all users and against which each designated user frequency is individually adjusted. Commercial mode-locked semiconductor laser sources are capable of achieving a level of signal pulse frequency stability which limits jitter to within the desired range of an order of magnitude less than the typical one picosecond (ps) duration, $\tau$, of the signal pulse.

The pulse rate frequencies are assigned to a community, N, of users such that a given first user transmits a signal of pulse duration, $\tau$, and a frequency, $f_1 = 1/T_1$, where $T_1$ is the time between pulses. Each additional user is assigned a respective transmission signal having the same pulse duration, $\tau$, and a frequency differing from the previous, e.g., by an increasing delay, $\Delta t$, in the period, or time between pulses, where the delay, $\Delta t$, is preferably greater than the pulse duration ($\Delta t > \tau$) and sufficiently small to be regularly distributed over the community of users ($\Delta t < T_1/N$). The users may then transmit simultaneously at their respective assigned frequencies bit stream signals of data which are combined to form a multiplexed signal directed to any number of receiver sites in the network. Any manner of common data encoding, such as phase modulation, wavelength modulation, polarization modulation, or the like, may be employed.

At a receiving site, the multiplexed signal stream is divided into a number of identical streams which are directed to a selector capable of distinguishing any desired one of the component signals. This selector may comprise a number of cascaded optical logic gates, each having means for delaying a signal stream by a time, $T_k$, equal to the period, $1/f_k$, of the desired signal of user, K. The first selector gate receives a first stream of the total multiplexed signal and a second stream of that signal after it has been delayed by a period, $T_k$. This gate provides an "AND" logic function which yields as its output a bit stream signal consisting essentially of the respective bits of each of the input streams which are separated by precisely one period, $T_k$, namely the original component signal of user, K. In order to ensure against sporadic overlap of bits from other component signals and to thus improve the BER, this first gate output signal may be directed to a second gate along with a third stream of the total multiplexed signal which has been delayed by a multiple, $2T_k$, of the desired signal period. The cascading of logic gates in this manner may be extended as required to achieve a specified BER.

The optical logic gate employed in the selector may be any of the nonlinear fiber coupler (Rowland, *J. Of Lightwave Tech.*, Vol. 9, No. 9, September 1991, pp. 1074–1082) or semiconductor etalon (Richardson et al., *IEEE J. Of Quantum Electronics*, Vol. 27, No. 3, March 1991, pp. 804–808) devices, or self-electrooptic effect devices (McCormick et al., *IEEE Photonics Tech. Letters*, Vol. 3, No. 3, March 1991, pp. 232–234) which operate in the picojoule switching power range. Preferred, however, due to their femtojoule switching power requirements for picosecond switching times are the bistable semiconductor laser amplifiers (Dagenais et al., *Critical Rev. of Optical Sci. and Tech.*, R. A. Athale, Ed., Vol. CR35, pp. 126–154, SPIE, 1990). Optical fibers of varying lengths provide simple, yet stable delay elements which when combined in arrays with optical switching devices provide effective means for selecting desired transmission signals of any one network user. Common processing systems provide signal decoding and data recovery from selected signal streams, and appropriate optical threshold and amplification means account for the gradient light transmissions of the optical logic devices.

BRIEF DESCRIPTION OF THE DRAWING

The invention will be described with reference to the accompanying drawing of which.

DESCRIPTION OF THE INVENTION

Figure 1:
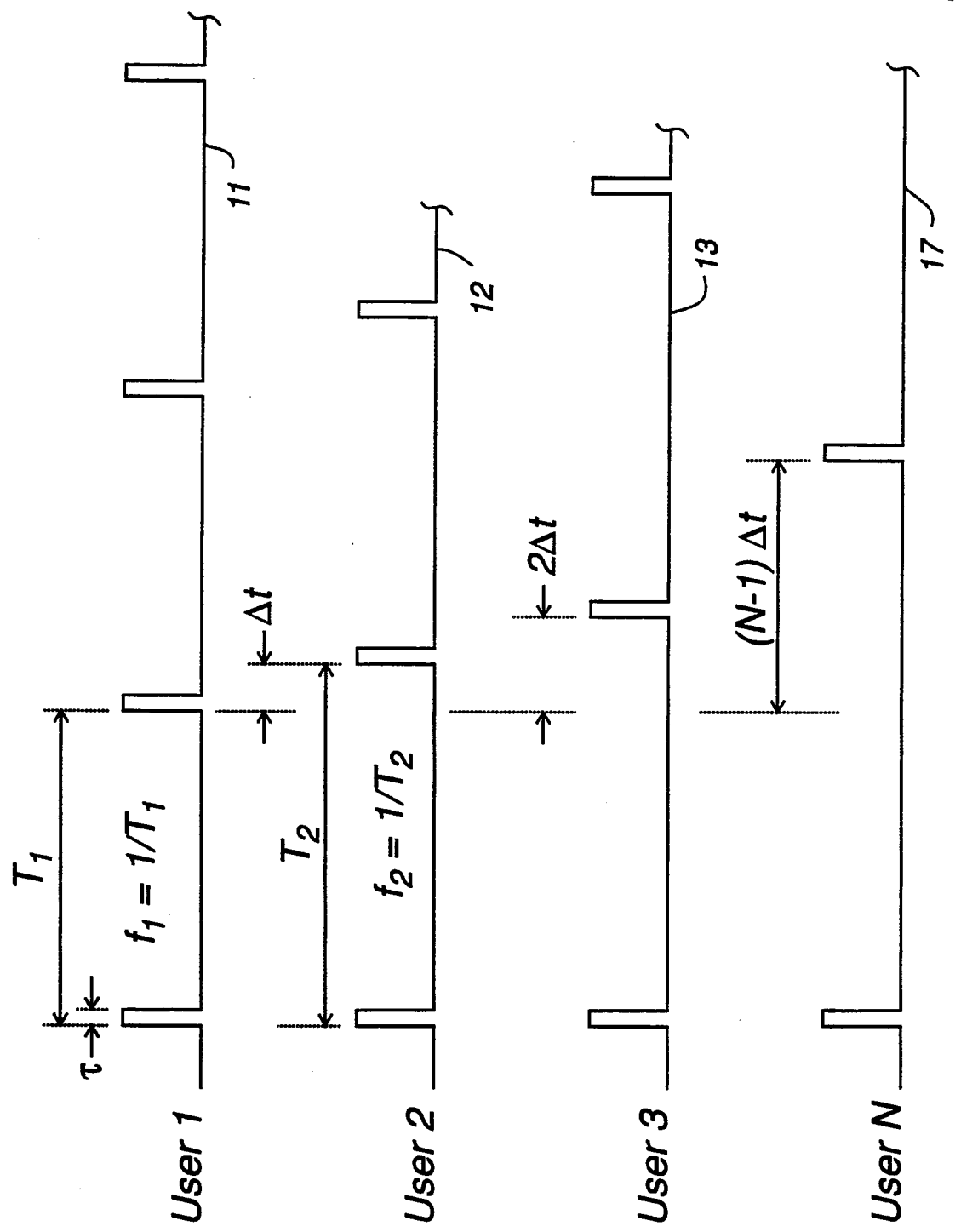
FIG. 1 is a timing diagram depicting relative user transmission pulse streams in a system of the present invention.

The present system accommodates a plurality, N, of users, or customers, of the network whose individual assigned transmission frequencies are related to one another as represented in FIG. 1. The optical pulse stream transmission 11 of User 1, which may serve as a "pacing" frequency against which the remaining user frequencies are stabilized, typically consists of light source output pulses of a duration, $\tau$, in the picosecond (ps) range with a time period, $T_1$, between pulses. This output from a modulated laser, for example, should be stabilized in frequency to a degree which will limit pulse jitter to a range of at least an order of magnitude less than the pulse duration. Such frequency stability can be reasonably expected from actively mode-locked lasers through stabilization of the laser cavity optical path length to within about 1 $\mu$m.

Each of the remaining users of the system transmits a string of light pulses having substantially the same pulse duration, $\tau$, but varying in period from $T_1$ by a regular multiple of an offset, $\Delta t$, which should be longer than the pulse duration, but short enough to be distributed over the output streams of all users, N, i.e., $\tau < \Delta t < T_1/N$. In this manner, the period, $T_2$, of User 2's pulse stream 12 will be $T_1 + \Delta t$, that of User 3's pulse stream 13 will be $T_1 + 2\Delta t$, and so on through the pulse stream 17 of User N which will have a period of $T_1 + [(N-1)\Delta t]$.

Figure 2:
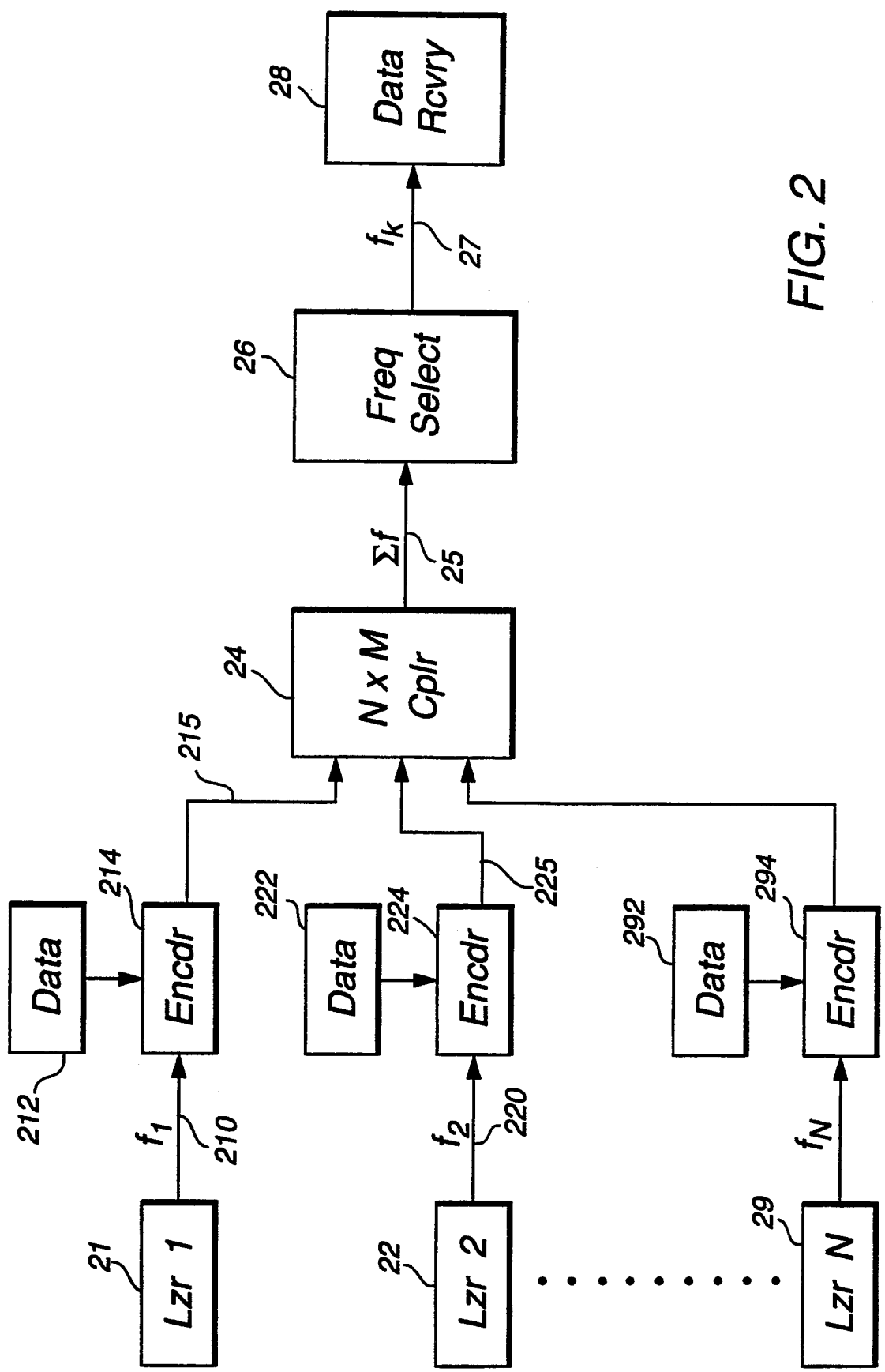
FIG. 2 is a schematic diagram depicting a typical telecommunication system utilizing the present invention.

Operation of the system is generally shown in FIG. 2 which depicts the transmission light sources, e.g., lasers, Lzr 1, Lzr 2, . . . , Lzr N, of a plurality, N, of users simultaneously transmitting data at their respective frequencies, $f_1, f_2, \ldots, f_N$, through network transmission medium 25 as a signal of multiplexed frequencies, $\Sigma f$, which is processed in a receiving customer's frequency selector 26 to extract the individual signal having the frequency, $f_k$, of the desired transmitting user, k. Considered in more detail, the $f_1$ constant frequency pulse stream from the first system user's light source 21 is directed, as on fiber 210, to encoder 214 where it is impressed with transmission data from source 212 by any common means, such as phase, wavelength, or polarization modulation. The modulated signal is then directed via fiber 215 to coupler 24. Likewise, pulse stream $f_2$ which varies in frequency from $f_1$ by a constant period increment, $\Delta t$, is encoded at 224 with a second user's data from source 222 before being conducted via fiber 225 to coupler 24. Other users of the system, through User N, similarly direct to coupler 24 their individual data encoded upon respective output pulse streams of regularly varied designated frequency.

Coupler 24 operates in the usual manner to combine the N signals input from the plurality of transmitting users and provide one signal of multiplexed frequencies, $\Sigma f$, which is distributed individually to the community of M receiving customers, typically on a network comprising representative optical fiber 25. Each receiving customer is equipped with facilities including a frequency selector 26 by which a single desired transmitted signal of representative frequency, $f_k$, is extracted from the multiplexed signal and forwarded, as on fiber 27, to data recovery means 28 including the usual decoding and optical/electrical conversion devices.

Figure 3:
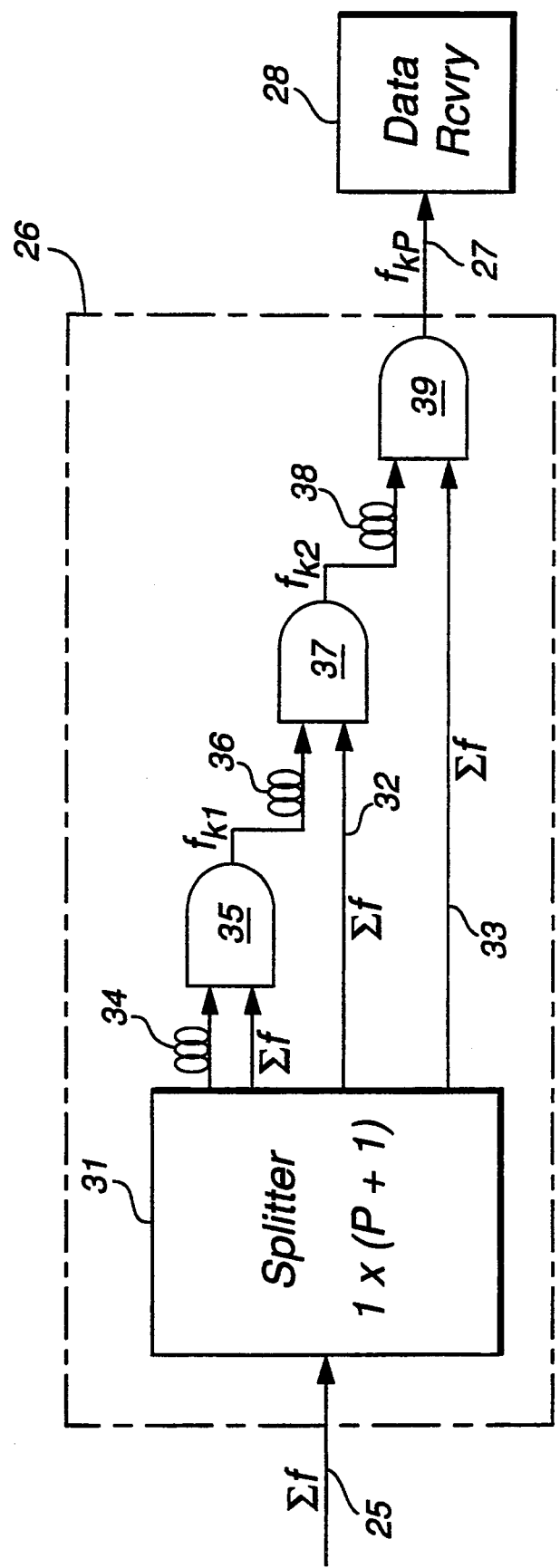
FIG. 3 is a schematic diagram depicting one embodiment of a signal selector according to the present invention.

Instrumental in the operation of the present system is frequency selector 26 which is capable of isolating one designated transmission frequency from the multiplexed frequency signal provided to each of the M system customers. One embodiment of such a selector is shown in FIG. 3 as comprising a splitter 31 which divides the multiplexed $\Sigma f$ signal received via fiber 25 into a number of like $\Sigma f$ signals that are distributed, as on fibers 32, 33, to a plurality, P, of optical logic "AND" gates 35, 37, 39 selected from the earlier-noted types of such bistable and non-linear devices. The number, P, of gates utilized in selector 26 depends primarily on the anticipated level of error and the desired bit-error ratio (BER), of which more is discussed below. The number of replicated $\Sigma f$ signals is then determined as $P+1$.

The first gate 35 receives from splitter 31 a pair of $\Sigma f$ signals of which one is conducted to the gate with substantially no delay while the other is subjected to a predetermined time delay, such as in fiber coil 34, precisely equal to the pulse signal period, $T_k$, assigned to User k. Gate 35 passes only those signal pulses arriving simultaneously at both inputs, i.e., pulses which are separated in time by the period, $T_k$, and thus isolates the pulse stream of frequency, $f_k$, emanating from User k. The signal of frequency, $f_{k1}$, output from gate 35 consists substantially of the signal from User k; however, due to the asynchronous nature of the system, as well as other anomalies, the $f_{k1}$ signal may comprise some pulses from other users. For example, a pulse from each of two undesired users may arrive at the selector with a time interval equal to the period, $T_k$, of the desired signal, or a pulse from an undesired user may arrive at the selector at the same time as another comprising the desired signal, but with an opposite encoded logic. Therefore, to remove such undesired signal components, the output, $f_{k1}$, from gate 35 is subjected to a second $T_k$ delay at 36 before being input with another branch 32 of multiplexed signal, $\Sigma f$, to a second gate 37. The resulting output signal, $f_{k2}$, is thus limited to only those pulses of the multiplexed signal which are repeated at least twice with a precise $T_k$ period separation, thereby eliminating the singly occurring anomalies. A major improvement in BER is thereby achieved. Additional delays 38 and gates 39 may be included in selector 26 to reach the predetermined goal of P gates producing the desired level of purity in final signal, $f_{kP}$, which will yield a prescribed BER.

Figure 4:
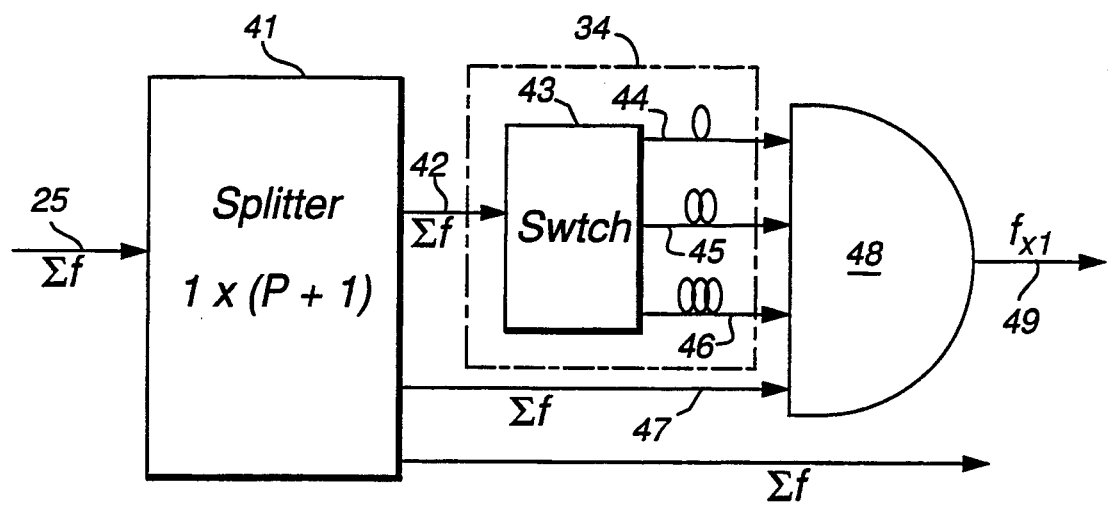
FIG. 4 is a schematic diagram depicting another such signal selector embodiment.

In order to provide selector 26 with a broad range of frequency selectivity, each of delays 34, 36, 38 may comprise a number of fiber lengths, or coils, each being equivalent to a different user pulse stream period, and include an optical switch to appropriately direct a gate input signal through the desired delay. Such an arrangement is generally shown in FIG. 4 where the first of the $P+1$ branches of $\Sigma f$ multiplexed signals from splitter 41 is conveyed via fiber 42 to delay means 34 comprising optical switch 43 in which it is directed according to the desired user frequency through the one of representative delay lines 44, 45, 46 providing respective user period, $T_x$. The delayed signal is then input to optical "AND" gate 48 with undelayed $\Sigma f$ comparison branch 47. Gate output, $f_{x1}$, of the desired user's signal frequency, as determined by selection of the switched delay line, is then conducted via fiber 49 to the next similarly set delay switch of as many stages as may be necessary to achieve the required BER.

Figure 5:
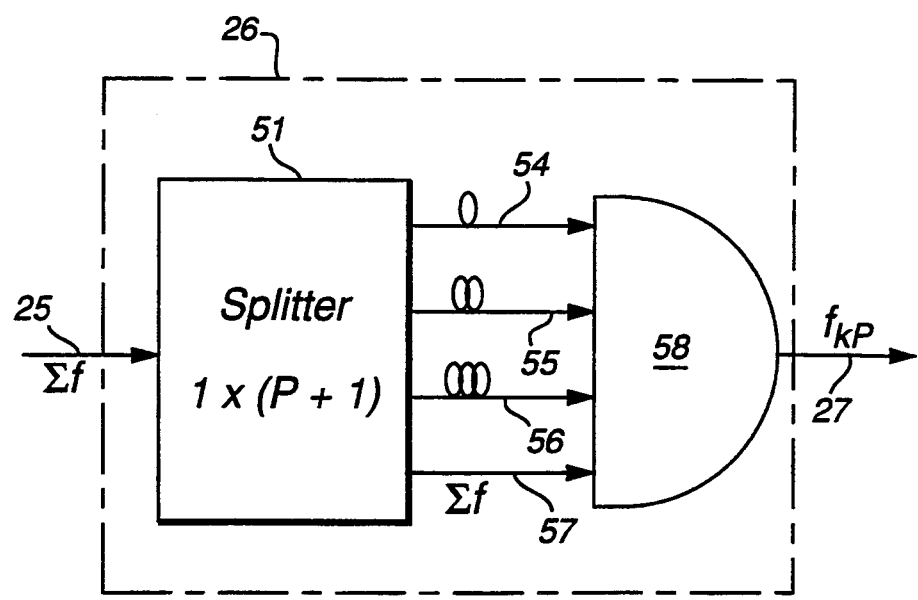
FIG. 5 is a schematic diagram depicting yet another signal selector embodiment of the present device.

Another variation in pulse frequency selector 26 is shown in FIG. 5 where the desired BER for the signal of User k is obtained with a single optical logic "AND" gate 58. According to this arrangement, all signals from splitter 51 are directed to gate 58 with the respective varying degrees of delay utilized in the earlier-described multiple cascaded gate embodiment. While fiber 57 carries the reference $\Sigma f$ multiplexed signal, the remaining P split branches are subjected to progressive delays varying by multiples of period, $T_k$, in representative delay lines 54, 55, 56. The output of gate 58 is signal, $f_{kP}$, having the desired BER.

Consideration of a minimum allowable BER is a significant factor in the design of the elements and operation of the present system. For example, an analysis of the major anticipated sources of error indicates the extent to which a system BER may be improved by means of cascaded logic gate filtering, or its equivalent progressive delay arrangement, or by techniques of signal structuring which will affect the operational ratio of pulse rate to data rate and determine the balance between BER and communication speed. The first such error source, which may be addressed with logic gate filtering, is represented by the arrival at a receiver of two undesired pulses, i.e., from two transmitters other than selected User k, at instants separated by the period, $T_k$, of that selected user. The second, which responds to signal structure, results from the appearance of an undesired pulse at a receiver at the same time as a desired pulse.

The filtering effect of P gates on the probability of the first type of error, $E_P$, in a common situation where only about half of the N users send data simultaneously and an optical pulse will be output from a logic gate only if two input pulses overlap by 75% may be represented by $$E_P = (N-2)(N-3)\ldots(N-P-1)(\tau/4T_k)^P.$$

Assuming a typical system of 100 users, N, with transmission pulse duration, $\tau$, of 1 ps and a given pulse period, $T_k$, of 10 ns, a single logic gate, or delay equivalent, is capable of providing an error probability of about $2.45 \times 10^{-3}$. A three gate system will improve to about $E_3 = 1.4 \times 10^{-8}$, while an additional system gate will yield about $E_4 = 3.3 \times 10^{-11}$.

Under the foregoing assumptions and further assuming that the data encoding procedure will result in an error only upon the occurrence of a desired transmission "0" bit and an undesired "1" bit, the probability of the second error condition will be $$E_m = 0.25^m(N-1)(N-2)\ldots(N-m)(\tau/4T_k)^m$$

where coefficient, m, is the number of repeated pulses in one bit of data. With a ratio, m, of equal pulse and data rates, i.e, where each pulse conveys one bit of data, this probability of error will be about $6.2 \times 10^{-4}$. An increase of this ratio by assigning, for example, three pulse repetitions to each data bit will improve this factor to about $E_3 = 2.3 \times 10^{-10}$. As is apparent from these examples, the combined probability of error $$BER = E_p + E_m$$

is affected in major part by the second error type and may therefore be controlled to a great degree by the choice of coefficient, m.

The versatility of the system can be seen in the following Table which shows a representative range of combinations of pulse duration, $\tau$, user community size, N, median pulse frequency, $f_{N/2}$, and pulse to data ratio, m, that will provide useful data capacity and BER:

| $\tau$ (psec) | N | $f_{N/2}$ (Gb/s) | m | $\Sigma f/m$ (Gb/s) | BER ($\times 10^{-9}$) |
|---|---|---|---|---|---|
| 0.1 | 200 | 10 | 5 | 400 | 0.3 |
| 0.2 | 200 | 5 | 5 | 200 | 0.3 |
| 0.2 | 100 | 5 | 4 | 125 | 1.4 |
| 0.5 | 100 | 5 | 5 | 100 | 0.8 |
| 0.5 | 200 | 1 | 4 | 50 | 1.4 |
| 1 | 50 | 1 | 4 | 12.5 | 0.08 |
| 1 | 500 | 0.1 | 4 | 12.5 | 0.1 |
| 1 | 200 | 0.1 | 3 | 6.6 | 1.9 |
| 10 | 100 | 0.1 | 4 | 3.3 | 1.4 |
| 10 | 200 | 0.01 | 3 | 0.66 | 1.9 |
| 10 | 20 | 0.01 | 2 | 0.1 | 13 |
| 100 | 20 | 0.01 | 3 | 0.66 | 1.4 |

Thus, a practical system utilizing pulse frequency division multiplexing according to the present invention is capable of maintaining satisfactory BER while providing substantial data transmission capacity for a broad range of user community sizes. In order to control pulse broadening which could exert a significant influence on BER, particularly at higher frequencies and over longer distances, it is preferred that the transmitters, while not necessarily being restricted to identical wavelengths, operate at wavelengths in close proximity to the zero dispersion wavelength of the network fiber medium, e.g., about 1300 or 1550 nm for dispersion shifted optical fibers.

The present system serves well in application to local telephone loops and local area optical fiber communication networks and can support hundreds of simultaneous users with total data throughput ranging in the hundreds of Gb/s. The system yields particularly advantageous results due in great measure to the increased stability control of pulse frequencies vis-a-vis optical frequencies, i.e., wavelengths, and the generally asynchronous nature of the technique which allows for less stringent controls than the restrictive time division multiplexing systems. This PFDM system provides the further advantage of being useful in combination with such other noted methods as high density wavelength division multiplexing to vastly improve data capacity and connectivity of fiber optic communications network.

The present invention thus has extensive versatility for improvement of data transport and communication, and it is anticipated that other embodiments and variants which likewise come within the scope of the following claims will become apparent to the skilled artisan in the light of the foregoing description.

What is claimed is:

1. A communications system comprising means for generating a plurality of light pulse streams wherein the frequency of pulses in each said stream is fixed at a different rate; means for combining said pulse streams to form a multiplexed pulse stream; means for transmitting said multiplexed pulse stream to a receiver; means at said receiver for selecting from said multiplexed pulse stream a light pulse stream having a predetermined one of said frequencies; means for encoding data into at least the light pulse stream having said predetermined frequency; and means at said receiver for recovering said encoded data characterized in that said selecting means comprises:
a) means for replicating said multiplexed pulse stream to yield a plurality of similar multiplexed pulse streams;
b) means for delaying at least one of said multiplexed pulse streams by a time equal to the period of said predetermined frequency;
c) at least a first optical logic gate; and
d) means for directing to said gate as input said delayed pulse stream and at least one of said multiplexed pulse streams, whereby the output of said gate consists essentially of a pulse stream having said predetermined frequency.

2. A system according to claim 1 which further comprises:
a) at least one additional optical logic gate;
b) means for delaying the output of said first gate by a time equal to the period of said predetermined frequency; and
c) means for directing to said additional gate as input said delayed first gate output and at least one of said multiplexed pulse streams, whereby the output of said additional gate consists essentially of a pulse stream having said predetermined frequency with a lesser bit error rate than said first gate output.

3. A system according to claim 2 which comprises a plurality of optical logic gates and wherein the input to each additional gate comprises one of said multiplexed pulse streams and the delayed output of the previous gate.

4. A system according to claim 1 wherein said selecting means comprises:
a) means for replicating said multiplexed pulse stream to yield a plurality of similar multiplexed pulse streams;
b) a plurality of means for individually delaying a multiplexed pulse stream by a time equal to the respective period of a different one of said pulse stream frequencies;
c) optical switching means for directing a multiplexed pulse stream to the one of said delay means corresponding to said predetermined frequency;
d) at least a first optical logic gate; and
e) means for directing as input to said gate the output of said one delay means and at least one of said multiplexed pulse streams, whereby the output of said gate consists essentially of a pulse stream having said predetermined frequency.

5. A system according to claim 1 wherein said selecting means comprises:
a) means for replicating said multiplexed pulse stream to yield a plurality of multiplexed pulse streams;
b) means for individually delaying a plurality of said multiplexed pulse streams by a respective time equal to a different multiple of the period of said predetermined frequency;
c) at least a first optical logic gate; and d) means for directing to said gate as input the output of said delay means and at least one of said multiplexed pulse streams, whereby the output of said gate consists essentially of a pulse stream having said predetermined frequency and a low bit error rate.

6. A method for high capacity network communication of data which comprises generating a plurality of light pulse streams of which the frequency of pulses in each said stream is fixed at a different rate; encoding said data into at least a first light pulse stream having a predetermined one of said frequency rates; combining said plurality of pulse streams to form a multiplexed pulse stream; transmitting said multiplexed pulse stream through a communication network to at least a first receiver; selecting from said multiplexed pulse stream at said receiver the light pulse stream having said predetermined one of said frequencies; and recovering said encoded data from said selected pulse stream characterized in that said selecting step comprises:
a) replicating said multiplexed pulse stream to yield a plurality of similar multiplexed pulse streams;
b) delaying at least one of said multiplexed pulse streams by a time equal to the period of said predetermined frequency;
c) providing at least a first optical logic gate; and
d) directing to said gate as input said delayed pulse stream and at least one of said multiplexed pulse streams, whereby the output of said gate consists essentially of a pulse stream having said predetermined frequency.

7. A method according to claim 6 which further comprises:
a) providing at least one additional optical logic gate;
b) delaying the output of said first gate by a time equal to the period of said predetermined frequency; and
c) directing to said additional gate as input said delayed first gate output and at least one of said multiplexed pulse streams, whereby the output of said additional gate consists essentially of a pulse stream having said predetermined frequency with a lesser bit error rate than said first gate output.

8. A method according to claim 7 which comprises:
a) providing a plurality of optical logic gates; and
b) directing as input to each additional gate one of said multiplexed pulse streams and the delayed output of the previous gate.

9. A method according to claim 6 wherein said selecting comprises:
a) replicating said multiplexed pulse stream to yield a plurality of similar multiplexed pulse streams;
b) providing individual means for delaying a plurality of said multiplexed pulse streams by a time equal to the respective period of a different one of said pulse stream frequencies;
c) directing a multiplexed pulse stream tie the one of said delay means corresponding to said predetermined frequency;
d) providing at least a first optical logic gate; and
e) directing as input to said gate the output of said one delay means and at least one of said multiplexed pulse streams, whereby the output of said gate consists essentially of a pulse stream having said predetermined frequency.

10. A method according to claim 6 wherein said selecting comprises:

a) replicating said multiplexed pulse stream to yield a plurality of similar multiplexed pulse streams;
b) individually delaying a plurality of said multiplexed pulse streams by a respective time equal to a different multiple of the period of said predetermined frequency;
c) providing at least a first optical logic gate; and
d) directing to said gate as input said delayed pulse streams and at least one of said multiplexed pulse streams, whereby the output of said gate consists essentially of a pulse stream having said predetermined frequency and a low bit error rate.

* * * * *